US007623121B2

(12) United States Patent
Dodge

(10) Patent No.: US 7,623,121 B2
(45) Date of Patent: Nov. 24, 2009

(54) FLEXIBLE PEN HOLDER FOR A COMPUTER

(75) Inventor: Steven P. Dodge, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 591 days.

(21) Appl. No.: 11/118,376

(22) Filed: May 2, 2005

(65) Prior Publication Data

US 2006/0244737 A1  Nov. 2, 2006

(51) Int. Cl.
*G06F 3/033* (2006.01)
(52) U.S. Cl. .................................................. 345/179
(58) Field of Classification Search ................ 345/179, 345/178.01, 156; 361/686, 683; 178/19.01–19.07
See application file for complete search history.

(56) References Cited

U.S. PATENT DOCUMENTS

| | | | | | |
|---|---|---|---|---|---|
| 1,799,049 | A | * | 3/1931 | Krueger | 211/69.7 |
| 3,697,737 | A | * | 10/1972 | Levkoff | 362/99 |
| 4,736,853 | A | * | 4/1988 | O'Mara | 211/88.01 |
| 5,438,475 | A | * | 8/1995 | Bradley | 361/683 |
| 5,483,262 | A | * | 1/1996 | Izutani | 345/179 |
| 5,839,712 | A | * | 11/1998 | Wang | 248/316.2 |
| 5,880,713 | A | * | 3/1999 | Belardinelli | 345/156 |
| 6,202,862 | B1 | * | 3/2001 | Acquaviva et al. | 211/69.5 |
| 6,246,577 | B1 | * | 6/2001 | Han et al. | 361/686 |
| 6,435,749 | B1 | * | 8/2002 | Lecce | 401/131 |
| 6,473,076 | B1 | * | 10/2002 | Thompson et al. | 345/179 |
| 6,550,737 | B1 | * | 4/2003 | Sai et al. | 248/311.2 |
| 6,621,697 | B2 | * | 9/2003 | O'Hara et al. | 361/686 |
| 2002/0088933 | A1 | * | 7/2002 | Yu et al. | 250/231.13 |
| 2002/0105503 | A1 | * | 8/2002 | Oueslati et al. | 345/173 |
| 2003/0076302 | A1 | * | 4/2003 | Langstraat | 345/161 |
| 2003/0106895 | A1 | * | 6/2003 | Kalal | 220/9.2 |
| 2004/0204058 | A1 | * | 10/2004 | Huang | 455/556.1 |
| 2004/0204132 | A1 | * | 10/2004 | Idani et al. | 455/566 |
| 2005/0275623 | A1 | * | 12/2005 | Chadha | 345/156 |
| 2006/0044288 | A1 | * | 3/2006 | Nakamura et al. | 345/179 |

\* cited by examiner

*Primary Examiner*—Chanh Nguyen
*Assistant Examiner*—Robert M Stone
(74) *Attorney, Agent, or Firm*—Shook, Hardy & Bacon LLP

(57) ABSTRACT

A computer system includes a holder attached to a housing of a pen-based computer. The holder may comprise a number of alternative materials, such as woven and non-woven sheet material. The holder may have a plurality of loop members configured for retaining a stylus or a pen. The holder may have a visual indication system for assisting the user to guide the pen into the holder. The holder may be removably attached to the housing. A computer system includes a rotatable holder attached to the housing of pen-based computer. An angle of rotation of the holder may be reported to the computer for display.

18 Claims, 9 Drawing Sheets

FLEXIBLE PEN HOLDER FOR A COMPUTER

FIELD OF THE INVENTION

The present invention relates to an input device for a computer. More particularly, the present invention relates to a flexible holder for a pen-based computer system.

BACKGROUND

Conventional computer systems, especially computer systems using graphical user interface (GUI) systems, accept user input from a conventional input device, such as a keyboard for entering text, and a pointing device, such as a mouse for operating the graphical user interface. A traditional notion of user interaction is generally in front of a desktop computer or at least sitting within close viewing proximity to a display screen as with laptop computers. Conventional systems are problematic in meeting the challenge of user interaction for new media. The evolution of new media models of computing, such as digital television, digital music, digital movies, have changed the traditional view of the GUI, and the manner in which users can interact with their computers.

One common use of computers and GUIs is to generate and edit electronic documents. These electronic documents can contain text (e.g., electronic word processors) and/or images (e.g., pictures), which are displayed on the user's screen for editing. To interact with these onscreen objects, the user typically uses the mouse to move an onscreen pointer to the desired object, and presses a button on the mouse to select the object.

The introduction of pen-based computing devices has changed the traditional view of the GUI, and the manner in which users can interact with their computers. While there are a number of designs, a pen-based computing device is generally interacted by way of a writable surface and a pen. The writable surface may be a display surface or a writing pad. While pen-based computers have been helpful, these known pen-based computers have several drawbacks, which significantly limit their effectiveness as discussed below.

Since a digitizer requires a specific pen, many usage scenarios require that the pen be readily available. As Tablet digitizers are not capable of responding to an arbitrary stylus or pen, most manufacturers have focused on a pen storage garage inside of the computer housing so that the pen can be stored when the machine is transported or stored. Unfortunately, when the Tablet is in use, the storage garage does not make for a convenient place and does not enable quick use to store the pen between uses and for retrieval.

For example, in some problem areas, a user may be sitting in a chair with a convertible tablet such as a Tablet computer configuration resembling a laptop where keyboard is accessible, in their lap. Most of the time they are typing but the user occasionally may use the pen as a pointing device, for drawing, or for handwriting. The user does not store the pen in the garage because it's too difficult to the retrieve the pen quickly, so the user is left to tuck the pen behind her ear or juggle it while typing, for example. In another problem area, a user may be standing holding a "slate" tablet in one hand, and gesturing or holding a cup with the other. The user occasionally needs the pen in order to navigate or scroll a document on the screen, and otherwise does not need to hold the pen in her hand. The user again does not use the garage because it's too inconvenient to extract, and setting it on the screen requires too much concentration in holding the table level to prevent the pen from sliding off.

What is needed is a computing apparatus to support user interaction for an untethered environment for manipulating the GUI for the new media technologies and productivity activities, such as creation and modification of electronic documents, spreadsheets, database, drawings, photos, electronic mail and the like.

SUMMARY OF THE INVENTION

Aspects pertain to a holder for a pen-based computer system. In one aspect, a computer system includes a holder attached to the housing of a pen-based computer. The holder may comprise a number of alternative materials, such as woven and non-woven sheet material. In another aspect, the holder may have a plurality of loop members configured for retaining a stylus or a pen. In yet another aspect, the holder may have a visual indication system for assisting the user to guide the pen into the holder. In another aspect, the holder may be removably attached to the housing. In another aspect, a computer system includes a rotatable holder attached to the housing of pen-based computer. In yet another aspect, an angle of rotation of the holder may be reported to the computer for display. In another aspect, a processor may be configured to generate a signal to illuminate a portion of the holder based on in air-movement of the stylus with respect to the holder. In another aspect, a processor may be configured to receive rotational signals indicative of axis rotation of the pen when engaged in a holder. In another aspect, a processor may be configured to receive directional signals indicative of multiaxial movement of the pen when engaged in a holder.

The above and other aspects, features and advantages of the present invention will be readily apparent and fully understood from the following detailed description illustrative embodiments in conjunction with the accompanying drawings, which are included by way of example, and not by way of limitation with regard to the claimed invention.

DETAILED DESCRIPTION

Illustrative Operating Environment

Various aspects of the present invention may at least be described in the general context of apparatus and computer-executable instructions, such as program modules, executed by one or more computers or other devices. Accordingly, it may be helpful to briefly discuss the components and operation of a general purpose computing environment on which various aspects of the present invention may be implemented. A host computer system can be used for processing data new media technology environment. Such an illustrative host computer system 100 is illustrated in FIG. 1.

Figure 1:
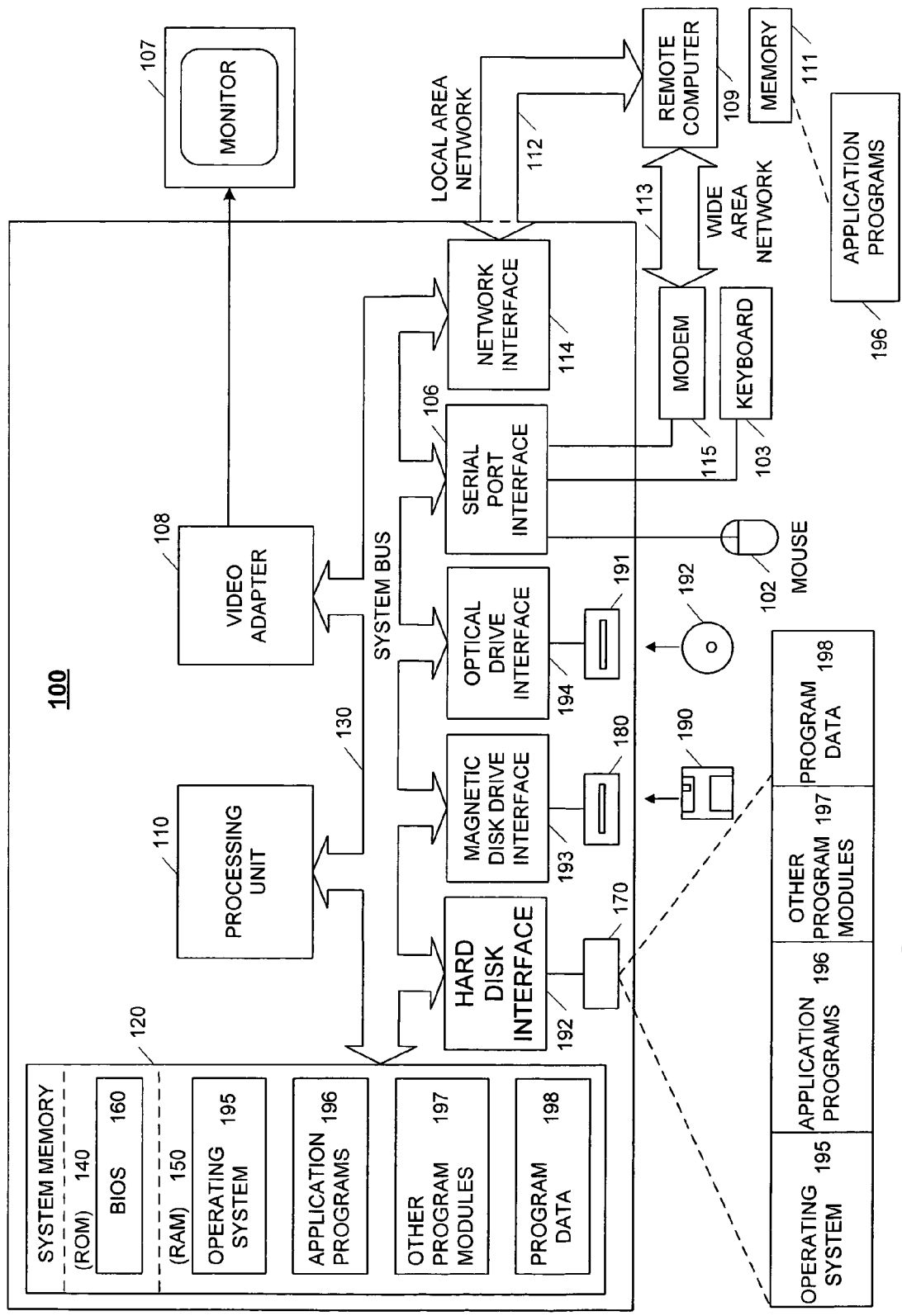
FIG. 1 is a functional block diagram of an illustrative general-purpose digital computing environment in which one or more aspects of the present invention may be implemented.

Accordingly, FIG. 1 illustrates a schematic diagram of an illustrative general-purpose digital computing environment that may be used to implement various aspects of the present invention. In FIG. 1, the host computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through input devices, such as a keyboard 103 and a pointing device 102. Other input devices (not shown) may include a microphone, joystick, game pad, satellite dish, scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device with a display screen is also connected to the system bus 130 via an interface, such as a video adapter 108.

The computer 100 may operate in a networked environment using logical connections to one or more remote computers, such as a remote computer 109. The remote computer 109 may be a server, a router, a network PC, a peer device, or other common network node, and may include many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device.

It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Figure 2:
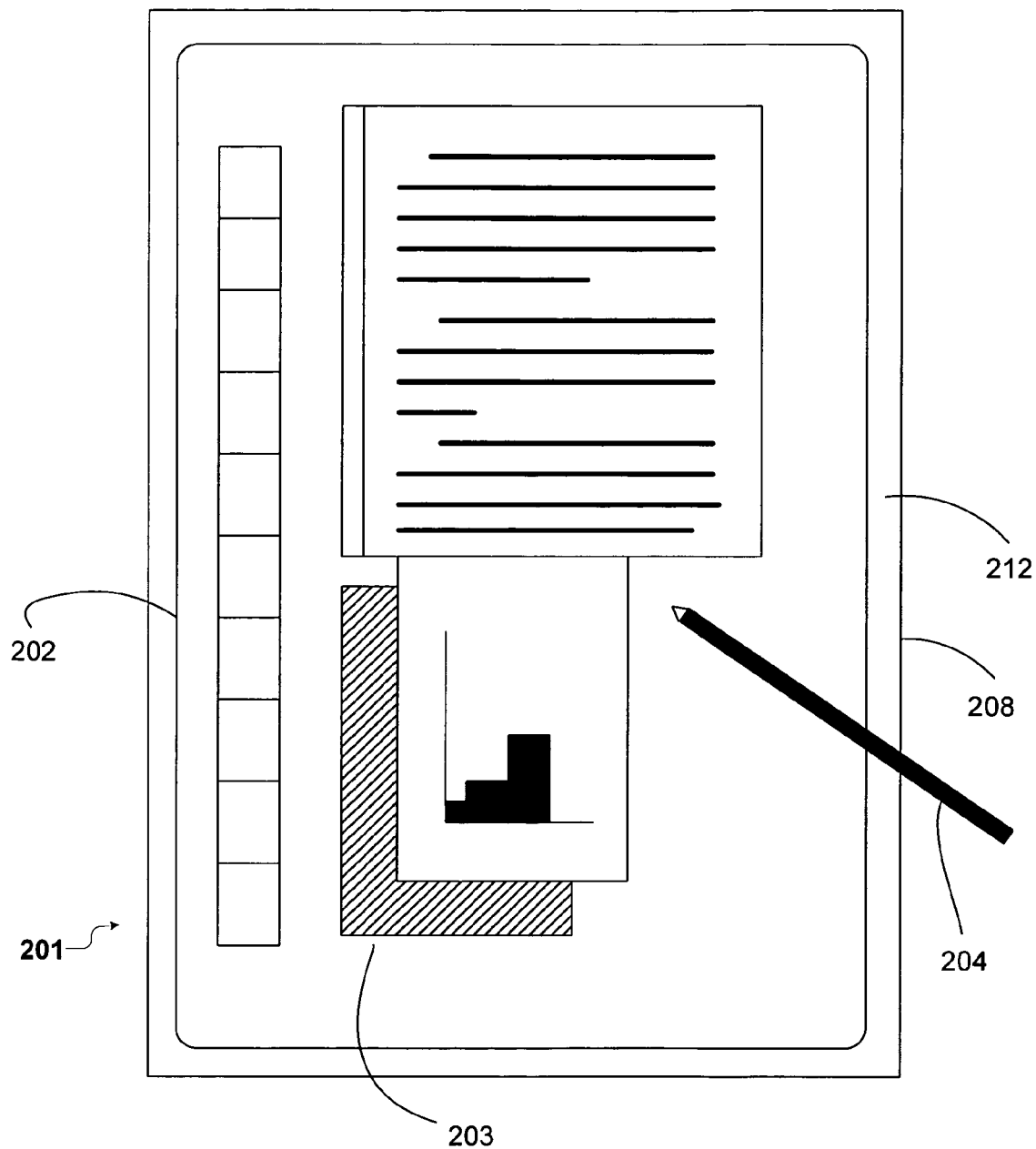
FIG. 2 is a schematic representation of a pen-based computing system arrangement according to one or more aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

Pen-based computing system 201 includes a housing 208 with a front face 212. Using stylus 204, a user may select, highlight, and/or write on the digitizing display surface 202.

Examples of suitable digitizing display surfaces 202 include electromagnetic pen digitizers, such as Mutoh or Wacom pen digitizers. Other types of pen digitizers, e.g., optical digitizers, may also be used. Pen-based computing system 201 interprets gestures made using stylus 204 in order to manipulate data, enter handwriting, create drawings, and/or execute conventional computer application tasks, such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. In an alternative arrangement, stylus 204 could also be a stroke capture type of device which stores pen strokes. Consequently, the term "user input device", as used herein, is intended to have a broad definition and encompasses many variations on well-known input devices such as stylus 204.

Illustrative Computing Arrangements

Figure 3:
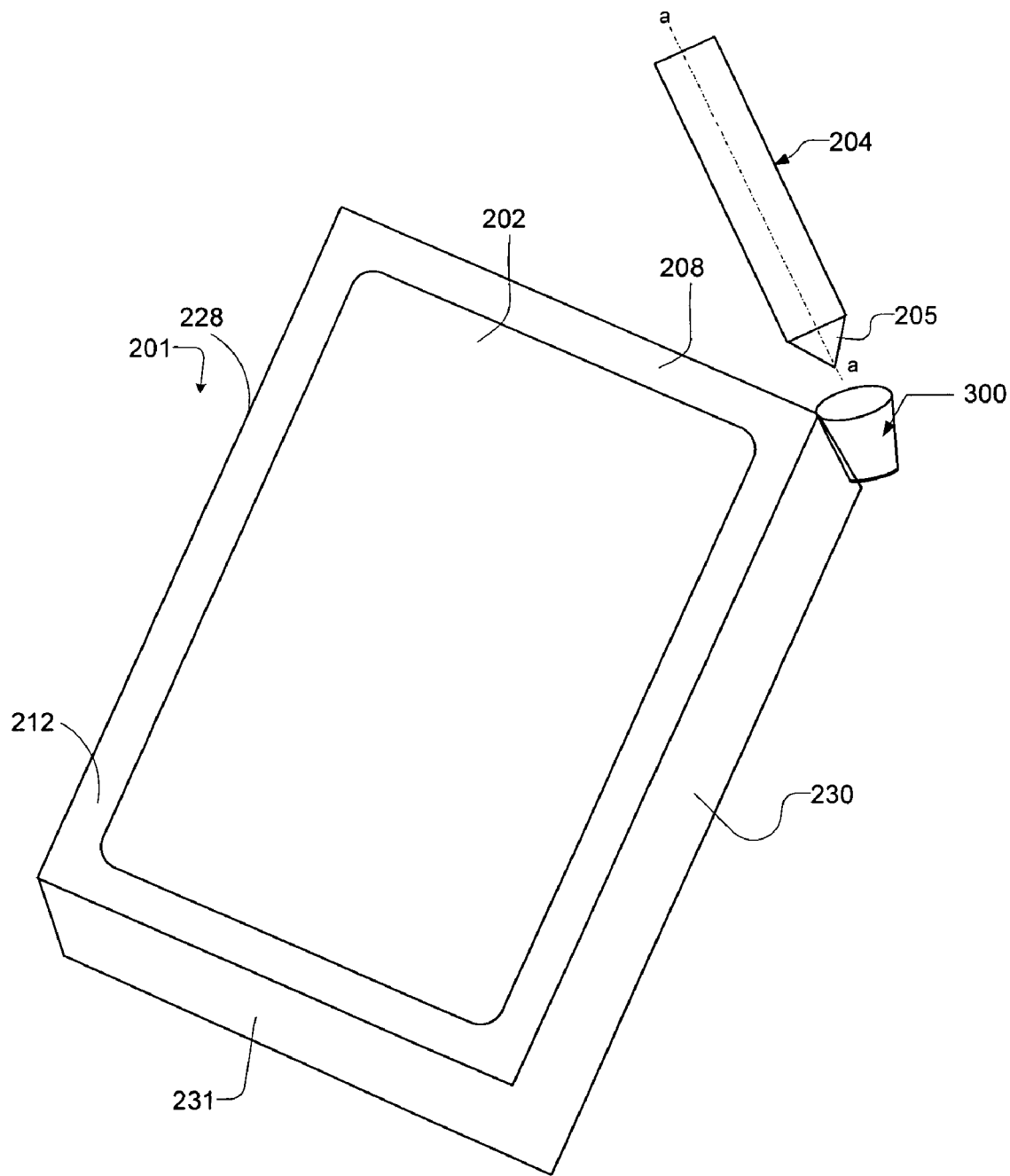
FIG. 3 is a schematic representation of a pen-based computing system arrangement with a pen retaining device according to one or more aspects of the present invention.

Referring to FIG. 3, the illustrative pen-based computing system 201 includes a flexible holder or holster 300 for a writing instrument, such as stylus 204, mounted to the housing 208. Holder 300 provides flexible support for a stylus object, while enabling a range of movement and adjustability. In one aspect, holder 300 is supplied to reliably enhance the usability of computing system 201 when using the stylus 204. To provide effective ergonomic considerations for the user, holder 300 may be disposed in or at least partially on a housing side, such as a left side face 228 or right side face 230 of the housing 208. In these arrangements, holder 300 may extend away from the side faces 228 and/or side face 230. This side mounting arrangement is particularly advantageous for the user to retain the stylus 204 quickly for writing or quickly for stowing the stylus 204. Holder 300 could be mounted on the bottom face 231 or the top face of the housing 208.

Figure 4:
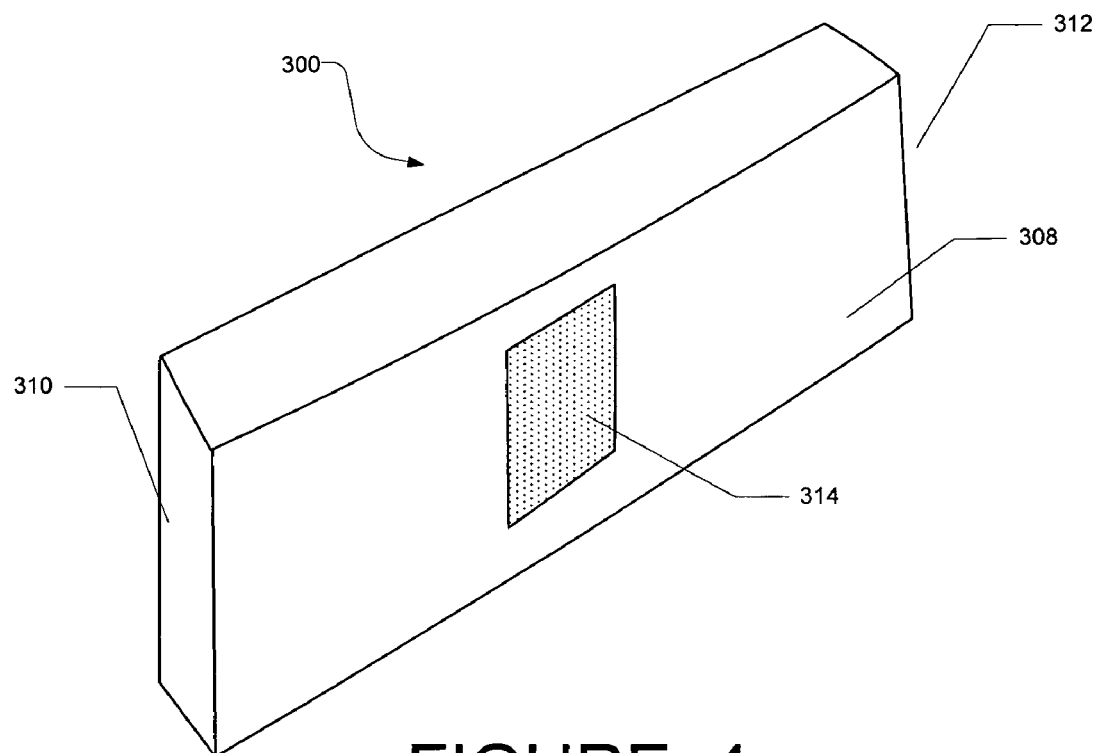
FIG. 4 is an enlarged schematic representation of a pen retaining device in an unassembled arrangement according to one or more aspects of the present invention.

FIG. 4 illustrates a construction of the holder 300 in one unassembled stated. Holder 300 may comprise a strip of resilient sheet material. The resilient material may be constructed from a non-woven sheet material, such as polyurethane, flexible polyvinylchloride or an elastomeric material. Nevertheless, other resilient materials may be used. Alternatively, the resilient material can be constructed from a woven sheet material. The elastic behavior may be accomplished by employing woven elastic fibers. In one example, the material can be constructed from synthetic elastic fibers chiefly made from polyurethane. Nevertheless, resilient material may also include other types of fibers to achieve desired characteristics for holder to engage and retain the stylus 204. In an alternative construction, the resilient material may be constructed from a woven blend of elastic fibers and substantially inelastic fibers. The resilient material in a woven configuration may be provided with weave and knit patterns to vary the direction and amount of the elasticity. In one case, a circular perimeter engagement of the stylus 204 is advantageous. The material may be woven to provide equal four-way stretch capabilities, meaning that it stretches equally along all four planar axes. Alternatively, the woven elastic material may be formed so that it stretches more in one direction than another direction, such as in a cylindrical shape of holder 300, allowing the material to stretch more or less on a vertical axis b-b generally parallel with a longitudinal axis a-a of the stylus 204.

Figure 5:
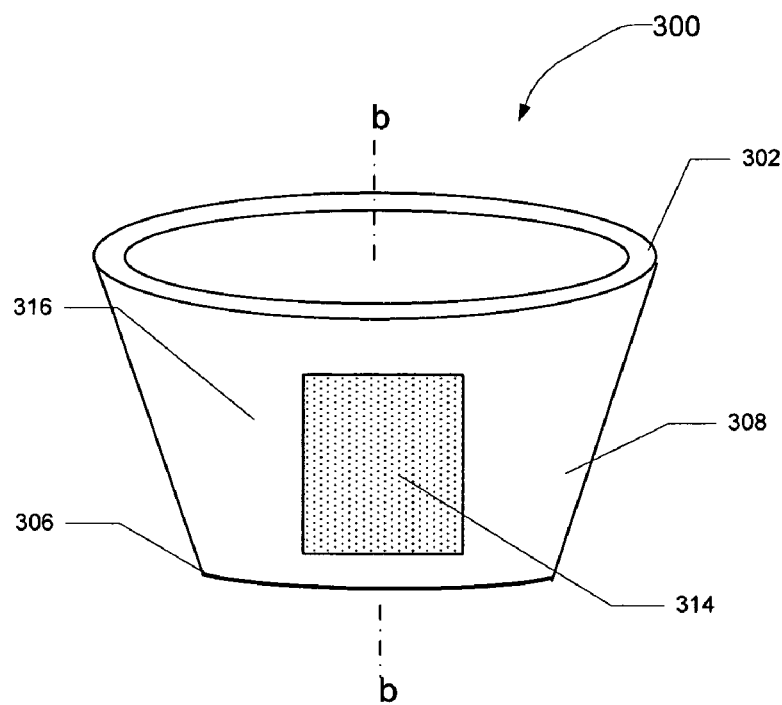
FIG. 5 is an enlarged schematic representation of a pen retaining device according to one or more aspects of the present invention.

Referring to FIG. 5, in example, holder 300 has an upper receiving end 302 sized to receive the writing end 205 of the stylus 204. A lower receiving end 304 is configured to circumferentially engage the body of the stylus 204. It should be recognized that upper receiving end 302 may engage the body of the stylus 204 as well. Holder 300 has an intermediate engagement region 308 extending between the upper end 302 and the lower end 304. Intermediate engagement region 308 is configured to resiliently stretch around the body of the stylus 204 so as to retain the stylus 204 therein. This resilient stretch characteristic provides a circumferential force around the body of the stylus 204. An advantage of this construction is that generally uniform loads are placed around the stylus for a snug fit when the pen-based computer 200 is moved or moved suddenly. Hence, holder 300 provides a stock absorption feature during movement of the computer 201.

Referring to FIG. 5, holder 300 has a tubular-like construction and forms a frustoconical shape. Alternatively, the holder 300 may have a tubular cylindrical shape. Nevertheless, the holder 300 may be of other shapes or the surfaces may be ribbed. Referring to FIGS. 4 and 5, in a woven arrangement, the lateral ends 310, 312 can be sewn together to form tubular-like holder 300. Nevertheless, the lateral ends 310, 312 may be brought together a joined by a suitable adhesive for fabrics. In a non-woven arrangement, ends 310, 312 can be joined together with a suitable adhesive to form tubular-like holder 300.

Referring to FIGS. 4 and 5, holder 300 includes a fastening portion 314 for attachment to the pen-based computer housing 208. The fastening portion 314 is provided on the outer surface 316 of the holder 300 at a desired location. In one example, the fastening member 314 can be generally central between ends 310, 312. Nevertheless, other locations are possible. The fastening portion 314 may be configured to provide a generally durable bond to the computer housing 208. In such a case, the fastening portion 314 may comprise a suitable adhesive or adhesive system, such as an adhesive tape, spray-on adhesive, brushed-on adhesive and other types. Alternatively, the fastening portion 314 can provide a removable coupling feature of the holder 300. In one illustrative construction, fastening portion 314 may include a mechanical locking component, for example a hook and loop closure component. Suitable mechanical locking systems are commercially available such as VELCRO® manufactured by VELCRO USA, Inc. The depicted holder 300 may include hooks on the outer surface 316. The mounting surface of the housing 208 may be provided with a woven or other similar material having interstices between its fibers. In effect, the interstices between the fibers of the material act as loops and lockingly receive the hooks of holder 300. This construction provides a suitable holding force between the holder 300 and computer housing 208. In another, example, the hooks may be provided on the computer housing 208 and fibrous material may be provided on the fastening portion 314. Nevertheless, alternative suitable fastening systems may be used. For example, fastening portion 314 may have a magnetic lock type of arrangement. Low strength magnets could be used to provide support to the holder and stylus configuration.

Figure 6:
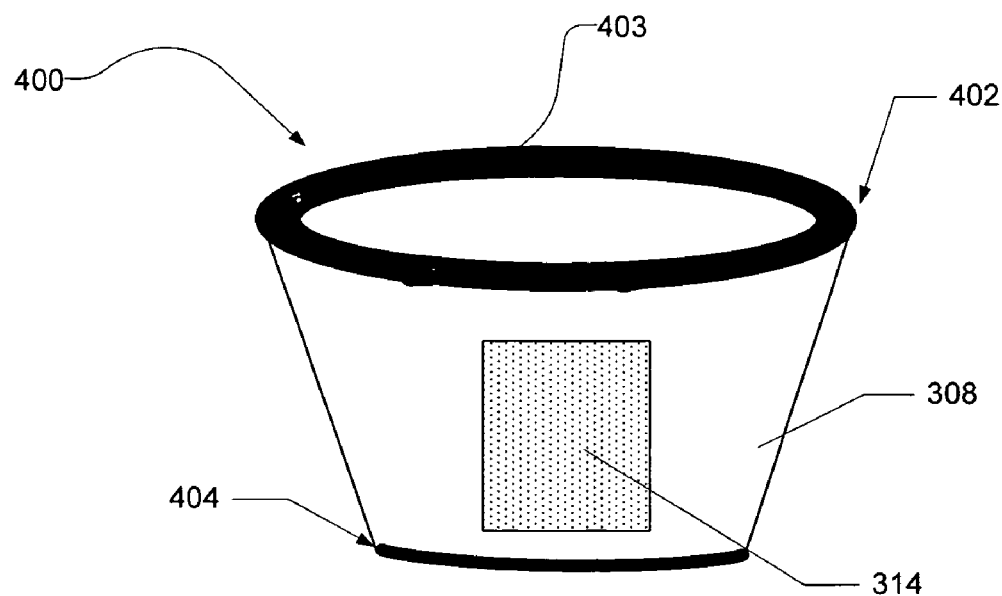
FIG. 6 is an enlarged schematic representation of an alternative pen retaining device according to one or more aspects of the present invention.
Figure 7:
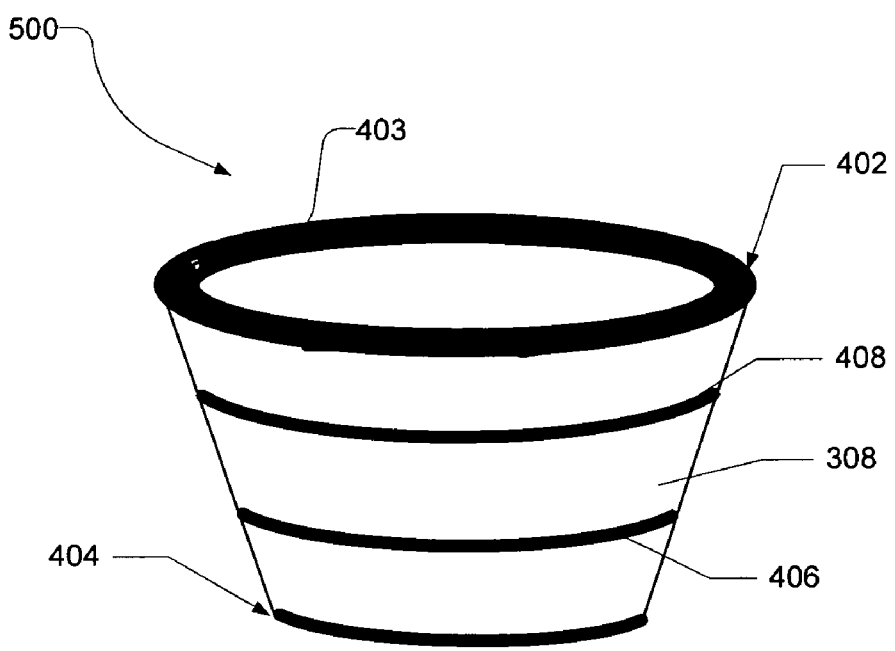
FIG. 7 is an enlarged schematic representation of an alternative pen retaining device according to one or more aspects of the present invention.

In an alternative construction of a holder 400 showing in FIG. 6, the upper receiving end 302 and the lower receiving end 304 may be provided with loop or ring member 402, 404. Loop members 402, 404 may be provided in a band or toroidal shape. In a toroidal shape configuration, the rounded interior 403 provides of a smooth transitional engagement of the body of stylus 204. The intermediate engagement region 308 extends between loop member 402 and 404 and can be provided in a woven or non-woven material construction. At least one of the loop member 402 or loop member 404 may be provided with resilient bias for engaging the stylus. For example, loop member 402 may be of a generally rigid construction to better guide the stylus 204 into the holder 400. Loop member 404 may be resilient and circumferentially engage the body of stylus 204 or the writing end 205. Alternatively, loop member 402 may be resilient to engage and loop member 404 may be of a rigid construction so that writing end 205 seats into the loop member 404. Nevertheless, both loop members 402, 404 may be of a resilient construction. Fastening portion 314 is provided in intermediate engagement region 308. In the alternative construction of a holder 500 shown in FIG. 7, one or more loop or ring biasing members 406, 408 can be provided in the intermediate region 308. The construction shown in FIG. 7, biasing members 406, 408 are provided with a sequential decreasing diameter so providing an improved retaining fit of the stylus 204. Nevertheless, in the biasing members 406, 408 may be provided in the same diameter or of other sizes.

Figure 8:
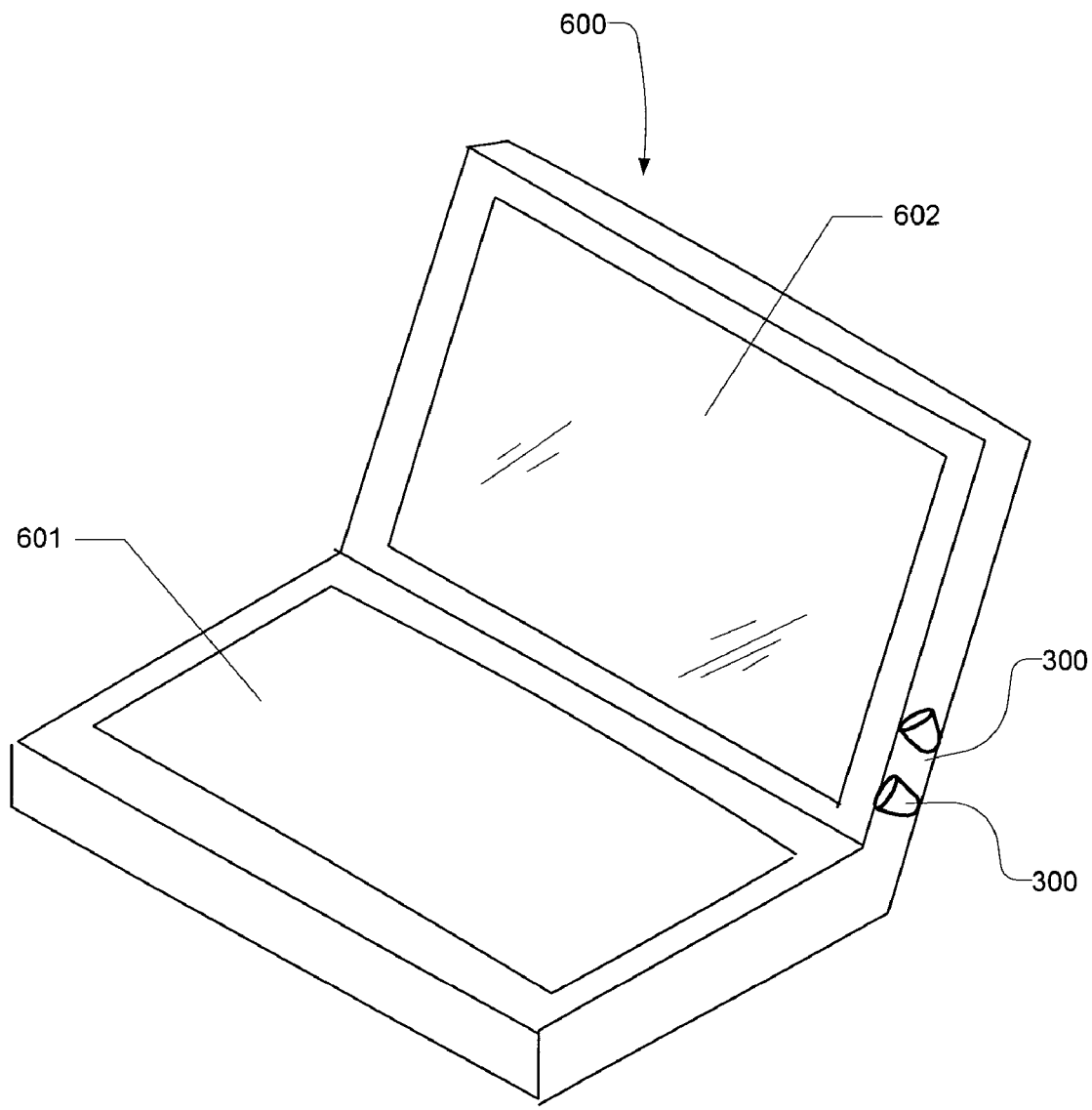
FIG. 8 is a schematic diagram of an alternative computing system arrangement computing system according to one or more aspects of the present invention.
Figure 9:
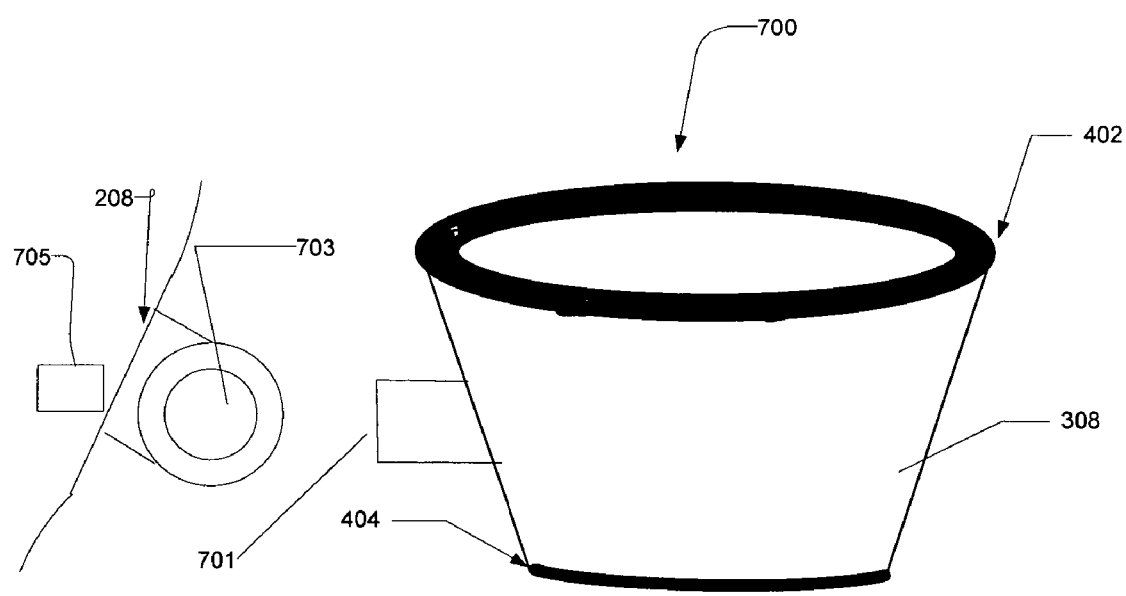
FIG. 9 is a schematic diagram of an alternative computing system arrangement according to one or more aspects of the present invention.

While aspects of the present invention have been described with reference to a slate type tablet computer, it will be understood that a clamshell type of computer, such as a convertible notebook computer, may be used without departing from the scope of the invention. Thus, the term tablet computer is intended to include laptops with integrated digitizers, tablet mode notebooks/laptops which may convert into a slate-type computer for use. Nevertheless, some of the aspects disclosed herein may be applied to desktop monitors with integrated screen pen digitizers. In one illustrative example shown in FIG. 8, a convertible tablet computer 600 includes a writable display surface 602 and a keyboard 601. Display surface 602 has the same functionality and construction as display surface 202. In this arrangement, the convertible tablet has two housing members or case members for the retaining components, e.g., one housing member for the display screen 602 and the other housing member for the keyboard 601. When in a tablet mode, the housing may be defined by the housing members attached together, albeit, somewhat thicker than a slate type tablet. The holders 300 can be mounted both on the top member of the convertible tablet 600 as shown in FIG. 9. To provide ergonomic features and quick access of stylus 204, the angle of holder can be 0-60 degrees with respect to the horizontal. Nevertheless, other values are possible.

Alternate combinations of various aspects of the computing arrangements; either alone or in combination with one or more elements have synthetic effects to improve user interaction and/or efficiency of operation. To improve a quick access aspect, holder 300 provides an easy to see peripheral view targeting so that a user can continue to concentrate on what they are typing or gesturing, while quickly dropping the pen into holder 300. To aid in targeting visibility (for the "out of the corner of the eye" scenario), a highly visible color can be placed on the upper receiving end 302 of holder 300. Likewise, the biasing member 402 may be provided in a highly visual target color. In one example, orange color could be used to make the band openings more visible. Nevertheless, other colors could be used, such a visible green, yellow, or red. In another aspect, one could utilize a color that has a fluorescent characteristic under UV light (such as that in the spectrum emitted by a LCD backlight) and position the holster 300 to help make the holster opening 302 "glow" accordingly.

FIG. 9 illustrates an alternative construction of holder 700 with a rotatable system for connecting to a main body, such as the computer housing 208. The rotatable system provides structural support for an attached holder 700 and stylus 204, while enabling a range of incremental movement and adjustability. The rotatable system includes a pin member 701 matingly engagable with a receiver member 703. When the pin member 701 and receiver member 703 are engaged, an attached object, such as holder 700 is statically supported. Holder 700 may be of a molded construction with a suitable plastic material. Thus, intermediate region 308 and members 402, 404 may be molded together. Nevertheless, pin member 701 may be molded with holder 700 or pin member 701 may be adhesively attached. The pin member 701 may have an external surface with slight detents. User tactile feedback may include a feeling of resistance to rotation or detents so users can better gauge their degree of movement. In one arrangement, the rotation of the pin 701 may be sensed with a sensor 705, such as an optical sensor, and provide a signal to computer 201 of an angle of orientation. The incremental rotation can be any number of values, ranging from, for example 2-10 degrees or more. Further, the incremental angle rotation may be less than 2 degrees increments. Nevertheless, a visual indication of the angles of rotation may be provided in the form of a graphical object configured to operate with an appropriate event-driven operating system. Thus, a graphical user interface can have a display portion relevant to angle for a particular user.

In an alternative arrangement, the holder 700 may be rotatable with the screen display, for example when placing the computer into a slate type configuration. In one example of a convertible type tablet computer (See FIG. 8), a system of gears, such as toothed or worm type, may be disposed within the computer housing. As the screen display housing pivots downward towards the keyboard, this rotation may be counter-clockwise. To maintain the holder 700 in the same relative angular position during pivotal downward movement of the screen display housing, the holder would a have clockwise rotation. Nevertheless, an alternative system of clockwise rotation of the screen housing may be used. The incremental rotation of the holder 700 may be linked by a specific ratio of pivotal movement of the screen display towards the keyboard. Alternatively, a mechanical system attached the display screen hinge may be configured to automatically maintain the angle of the holder relative to the keyboard at a fixed value of approximately 60 degrees, or other values selected by the user. This angle can be different based on the rotation of the screen, e.g., portrait vs landscape mode, such as slate verses tablet mode. Nevertheless, a mechanical rotational system of gears, planetary gears, pulleys and/or the like with specific gearing ratios and/or sizes, such as diameters of gears may be employed by one of ordinary skill.

Figure 10:
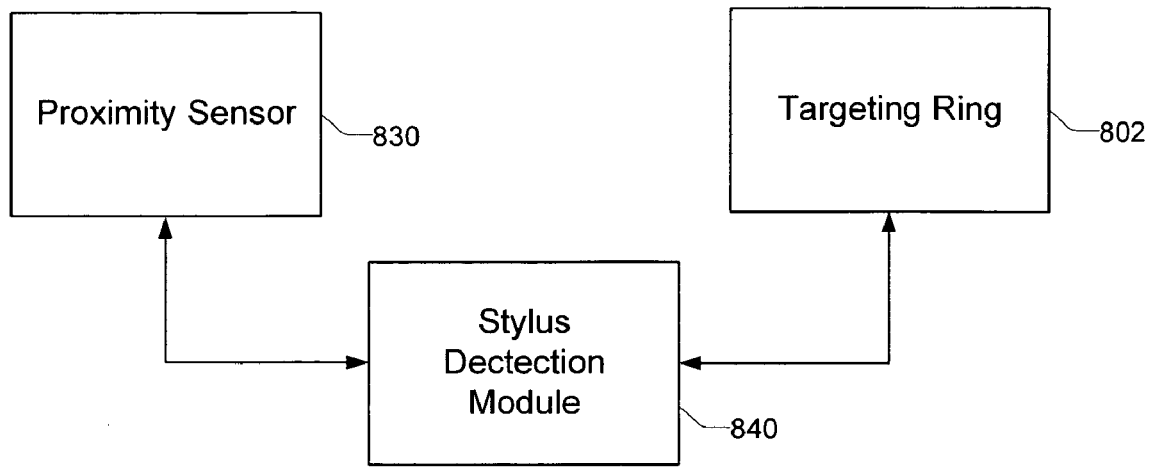
FIG. 10 is a schematic block diagram of a sensor system arrangement according to one or more aspects of the present invention.
Figure 11:
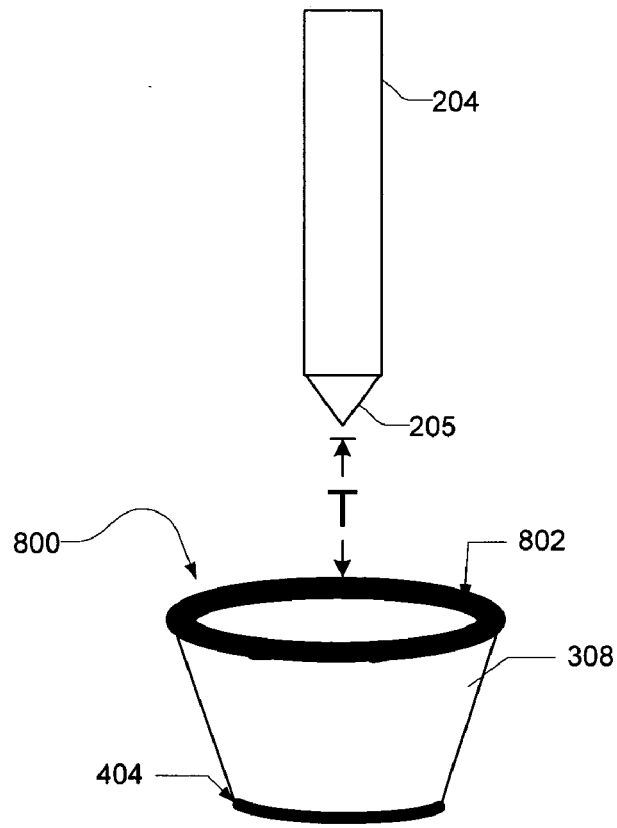
FIG. 11 is a schematic diagram of an alternative computing system arrangement according to one or more aspects of the present invention.

In another aspect referring to FIGS. 10-11, the operating software, application software or other software may be configured to anticipate when the pen is heading toward the holster to retention and to help the user target the holster 800. In one example, shown in FIG. 10, a stylus detection module 840 may be a software module which can determine the relative location of the stylus with respect to a sensor, such as a proximity sensor 830, digitizer screen 202 (FIG. 2), or ring 802 having a sensing function. This sensing feature helps the user target the holster 800 by detecting in-air movement in the direction of the holster, and then electrically illuminating a light source inside the "peripheral view" band 802 (e.g. an LED or other low-voltage light source). Nevertheless, the light source can be mounted on the band or ring 802; can be located on the computer housing, or on the holster 800. Nevertheless, other locations are possible for the light source to provide visual targeting of the holster 800. In one another aspect, the holster's proximity to the screen digitizer 202 may be used to generate a signal to illuminate the holster 800 when the pen is approaching the screen. Thus, the screen digitizer circuitry provides a sensing function for targeting the holster.

Referring to FIGS. 10-11, a digitizer 202 or sensor 830 may be configured to sense the stylus tip 205 within a threshold distance range denoted as "T", such as within 5-20 mm or less of the display surface 202, ring 802, or sensor 830. Nevertheless, other distance ranges are possible for operation. The digitizer or sensor 830 may sense signal strength and the signal strength may be a function of distance. In one arrangement, when the stylus tip 205 is within the threshold range T, a stylus-in-range event may occur. This event indicates that the stylus 204 is being used near or proximate the display surface 202, ring 802, or sensor 830, for example. Nevertheless, there are many possibilities for designating this type of event for an in-range indication of the stylus. The stylus-in-range event may then invoke a software process which activates the light source so as to provide visual targeting of the holster 800. Alternatively, when the stylus tip 205 is at a distance greater than the threshold range T, then a stylus out-of-range event may occur. Detection module 840 also detects the when the stylus 204 is absent from the display surface 202, sensor 830, or ring 802 and a corresponding event may occur as well. Nevertheless, the out-of-range event may then invoke a software process which deactivates the light source for illuminating the holster 800.

Figure 12:
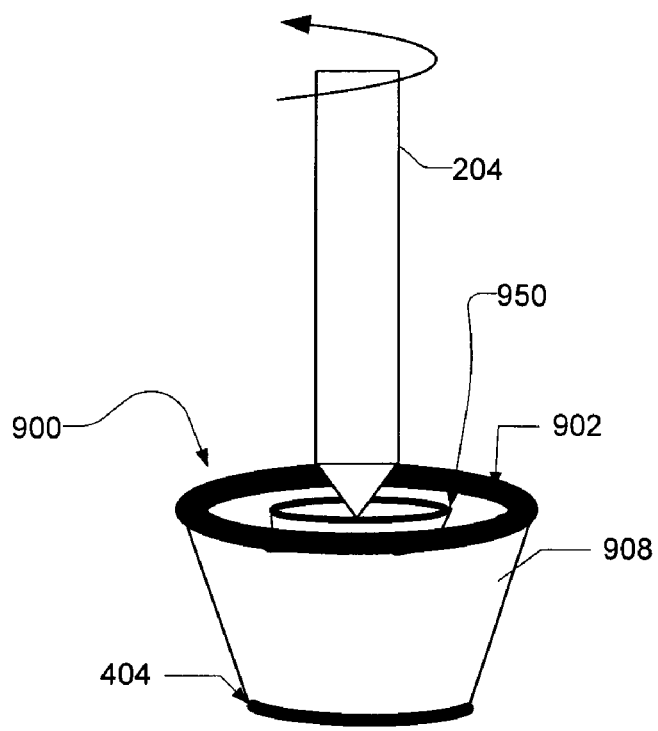
FIG. 12 is a schematic diagram of an alternative computing system arrangement according to one or more aspects of the present invention.

In alternative arrangement referring to FIG. 12, a processor may be configured to receive rotational signals indicative of axis rotation a-a (see FIG. 3) of the pen 204 when engaged in a holder 900. For example, while "docked" in an active holder 900, the pen 204 may serve as a handle for GUI navigation, or a spindle that can be rotated to control volume or scroll a document. Nevertheless, other uses are possible. It should be recognize in a non-limiting sense that the term "active holder" generally denotes that the holder is operatively connected to a processor. For example, the processor may be in the holder, or the processor may be in computer 201, 100 or another location. It should be recognized that the operative connection of the processor may be via hardware and/or software instructions. Further, operative connection may be a wireless connection for example, with infrared frequencies or radio-controlled frequencies, such as Wifi or Bluetooth™ radio-frequency ("RF") specification and protocols. Further, it is contemplated that operative connection may have a Wi-Fi capability such that the holder can communicate via a wireless network using 802.11b protocol to host computer 100, 201 or other processor. Nevertheless, any appropriate wireless transmission protocol or wireless medium arrangement can be employed to connect the holder to host computer 100, 201 for operation to transmit or received data. In another example, the operative connection may be serial data via a Universal Serial Bus standard or other method.

In one arrangement of FIG. 12, holder 900 includes a rotatable holding portion 950 of similar shape of the holder. Holding portion 950 may be constructed of similar materials as holder 300, 400, 500, 700. Holding portion 950 is configured to engage body of the pen 204. Holding portion 950 rotates inside of the holder 900, such as within ring 902. A bearing ring or the like may be disposed in the interspatial portion between holder 900 and holding portion 950. Holder 900 has an intermediate portion 908 which may be of a harder material than the material of holder portion 950 for the bearing ring to travel thereon or otherwise engage. The amount of the rotation of holding portion 950 may be measured or sensed by an appropriate rotational sensor or sensing system.

Figure 13:
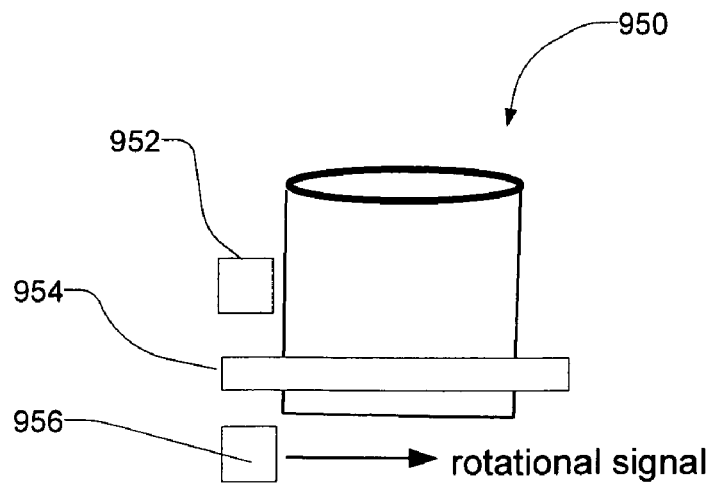
FIG. 13 is a schematic block diagram of a sensor system arrangement according to one or more aspects of the present invention.

For example, in FIG. 13, a rotational movement sensing system can include a light source 952, an encoder blade 954 attached to the perimeter of the holding portion 950, and a light detector 956. The encoder blades periodically obstruct the light beam when the holding portion 950 is rotated. The light detector 956 senses these obstructions and is coupled to a controller or software module to generate and relay a signal to the computer 100, 201 to provide navigation, scrolling or other features. It should be recognized that other types of rotational sensing systems may be used. For example, a rotary encoder operatively connected to the holding portion 950 may be used. Thus, rotational movement of the stylus 204 can be sensed when engaged in holder 900. The sensed movement provides rotational input data into the host computer for processing and coupling to a GUI. This processing for example, can be for y-axis scrolling, e.g., up or down the screen, or x-axis scrolling (horizontally). It is contemplated that the rotating data can be used to adjust zooming control in a GUI, e.g., the magnification of an object on the screen display 202. It is contemplated that the rotating data can be used to adjust audio volume control for clockwise or counter-clockwise rotation.

While "docked" in an active holster 900, the pen 204 may serve as a handle for joystick functionality such that a processor may be configured to receive directional signals indicative of multi-axial movement of the pen when engaged in a holder. This functional may be used in computing gaming software and other types of software uses. The holding portion 950 and holder 900 may be configured with pressure sensors to sense multi-directional movement of axis a-a of the pen 204 with respect to a vertical central axis of the holder 900. For example, when a user presses against the body of the pen 204 with a finger, the pressure direction and force may be detected by individual sensors coupled to the holding portion 950 or holder 900, and the sensors generate signals similar that of mouse movement. That is, the holding portion 950 moves with a tilting motion of the pen 204 and with respect to inside of the holder 900. In another example, the holder may be sensitive to movement of the pen along the axis of the pen itself (e.g. pushing the pen deeper into the holder or pulling it gently away from the holder), and such actions may be mapped to yet more actions in the software (e.g. press the pen deeper to zoom in, pull away gently to zoom out, and pull hard to remove the pen from the holder). The holding portion 950 may be biased vertically so that vertical movement is translated into signals. This can be achieved by force transducers or strain gauges, for example. Nevertheless, other configurations are possible.

There are any number of alternative arrangement for practicing techniques and aspects herein. In one example, the holder may be applied to non-computerized apparatus for ink pens. There are any number of alternative combinations for defining the invention, which incorporate one or more elements from the specification, including the description, and drawings and claims, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

What is claimed is:

1. A computer system, comprising:
a display screen attached to the housing in which the display screen is sensitive to input of a stylus; and
a resilient, rotatable holder attached to the housing, in which the holder is configured to retain the stylus therein, the holder comprising a holding portion wherein the holder senses movements of the stylus when at least a portion of the stylus is in the holding portion and facilitates generating data, based at least in part on the sensed movements, that is communicated to a processor to facilitate performance of at least one function associated with the display screen, the at least one function involves processing related to data associated with the display screen,
wherein a state of illumination of a portion of the holder is controlled based at least in part on in-air movement of the stylus in relation to at least one of the holder or the display screen, the portion of the holder is placed in an illuminated state when the in-air movement of the stylus is observed within a predetermined threshold distance of the at least one of the holder or the display screen while the stylus is outside of the holding portion of the holder, and
the holder is attached to one side of the housing that contains the display screen, wherein the one side of the housing is adjacent and perpendicular to another side of the housing that is directly connected to a portion of the housing that contains a keyboard, the holder is rotatable in relation to the display screen and the holder is automatically rotated in an opposite direction of movement of the display screen based at least in part on movement of the display screen to facilitate maintenance of a specified angle of the holder in relation to the keyboard associated with the housing.

2. The computer system of claim 1, the holder is of a tubular construction and includes a plurality of loop members.

3. The computer system of claim 2, the holder includes a woven material extending between the plurality of loop members.

4. The computer system of claim 3, at least one of the loop members is resilient.

5. The computer system of claim 2, the holder includes a visual target indication for guiding the stylus into the holder.

6. The computer system of claim 1, the holder is removably attached to the housing.

7. The computer system of claim 6, at least one of the holder or the housing includes a hook structure and the other of the holder and housing includes loops for engaging with the hook structure.

8. A computer system, comprising:
a display screen associated with a housing in which the display screen is sensitive to input of a stylus; and
a rotatable holder attached to the housing, in which the holder is configured to retain the stylus therein, the rotatable holder comprising a holding portion wherein the holder senses movements of the stylus when at least a portion of the stylus is in the holding portion and facilitates generating data, based at least in part on the sensed movements, that is communicated to the processor to facilitate performance of at least one function associated with the display screen, the at least one function is associated with processing related to data associated with the display screen, the processing related to data comprising at least one of scrolling, zooming, data selection, volume control, or navigation or movement in the display screen, associated with the data, and
wherein a state of illumination of a portion of the rotatable holder is controlled based at least in part on in-air movement of the stylus with respect to at least one of the rotatable holder or the display screen, the portion of the rotatable holder is placed in an illuminated state when the in-air movement of the stylus is sensed within a predetermined threshold distance of the least one of the rotatable holder or the display screen while the stylus is outside of the holder, and
wherein the rotatable holder is attached to a side portion of the housing that contains the display screen, and wherein the side portion is a side of the housing that does not have a hinge and is not directly connected to a portion of the housing that contains a keyboard, the rotatable holder is rotatable in relation to the display screen, and the rotatable holder is automatically rotated in relation to the display screen based at least in part on movement of the display screen to facilitate maintenance of a specified angle of the rotatable holder in relation to the keyboard associated with the housing.

9. The computer system of claim 8, the holder includes a resilient material.

10. The computer system of claim 8, the holder includes a plurality of loop members.

11. The computer system of claim 8, the holder includes a pin member and the housing includes a receiver portion configured to matingly engage the pin member.

12. The computer system of claim 8, a graphical object is generated, wherein the graphical object is displayed in the display screen and visually specifies an angle of rotation of the holder.

13. The computer system of claim 10, the holder has a frustoconical shape.

14. The computer system of claim 10, the housing comprises two pivotable case members and the holder is attached to one of the case members.

15. The computer system of claim 10, further comprising:
a stylus detection module that senses in-air movement of the stylus and determines a location of the stylus with respect to at least one sensor associated with the at least one of the rotatable holder or the display screen.

16. A computer system, comprising:
a display screen attached to a housing in which the display screen is sensitive to input of a stylus; and
a holder attached to the housing, in which the holder is rotatable and configured to retain the stylus therein, and wherein a state of illumination of a portion of the holder is controlled based at least in part on in-air movement of the stylus with respect to at least one of the holder or the display screen and the portion of the holder is placed in an illuminated state when the in-air movement of the stylus is sensed within a predetermined threshold distance of the at least one of the holder or display screen while the stylus is outside of the holder, the holder comprising a holding portion wherein the holder senses movements of the stylus when at least a portion of the stylus is in the holding portion and facilitates generating data, based at least in part on the sensed movements, that is communicated to a processor to facilitate performance of at least one function associated with the display screen, the at least one function relates to processing of data associated with the display screen,
wherein the holder is attached to a side portion of the housing that contains the display screen, and wherein the side portion is a side of the housing that does not have a hinge and is not directly connected to a portion of the housing that contains a keyboard, the holder is rotatable in relation to the display screen, and the holder is automatically rotated in relation to the display screen based at least in part on movement of the display screen to facilitate maintenance of a specified angle of the holder in relation to the keyboard associated with the housing.

17. The computer system of claim 16, the holder includes a plurality of loop members.

18. The computer system of claim 16, further comprising a sensor for sensing the in-air movement of the stylus.

\* \* \* \* \*

UNITED STATES PATENT AND TRADEMARK OFFICE
CERTIFICATE OF CORRECTION

PATENT NO. : 7,623,121 B2  Page 1 of 1
APPLICATION NO. : 11/118376
DATED : November 24, 2009
INVENTOR(S) : Steven P. Dodge It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 804 days.

Signed and Sealed this

Twenty-sixth Day of October, 2010

David J. Kappos
*Director of the United States Patent and Trademark Office*